March 17, 1931. A. THOMA 1,796,670

SHOE BOTTOM FILLER

Filed May 17, 1927 2 Sheets-Sheet 1

Inventor
Andrew Thoma,
by Roberts Cushman Woodberry
his Attorneys.

Patented Mar. 17, 1931

1,796,670

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

SHOE-BOTTOM FILLER

Application filed May 17, 1927. Serial No. 192,076.

This invention pertains to the manufacture of sheet material and more especially to the production of sheet material so constructed as to facilitate its shipment and storage and the rapid and economical reduction of such material to the form of relatively small sections. Materials which are stiff but not especially strong, for example, cardboard, wallboard, asbestos board, and the sheeted shoe-filler material more fully disclosed in my copending application Serial No. 183,302, filed April 13, 1927, are quite difficult to handle owing to their large extent and tendency to crack, bend, or break if not properly supported, and thus must ordinarily be carefully crated for shipment. Moreover, such large sheets or packages of sheets require storage space of a kind not always available, and when such material forms the basis for the production of relatively small blanks or sections which are cut or otherwise removed therefrom, the presentation of the sheet to the dividing instrumentalities is troublesome, and unless care be used in laying out the work a great deal of unnecessary waste often results.

While in certain of its broader aspects the present invention is not concerned with the specific character of the sheet material, I have herein chosen to illustrate it in connection with laminated sheet material or sheet filler pieces such as are more fully disclosed in my aforesaid copending application in which the preferred form of sheet material is described as comprising an intermediate layer of a plastic filler composition, such for example as is disclosed in either of the patents to Thoma, No. 832,002 September 25, 1906, No. 855,868 June 4, 1907, or other and later patents granted to the same inventor (such compositions being generally characterized by the presence of a permanently sticky, smeary, plastic binder uniting granules of cork or solid material having similar qualities), the composition as a whole possessing some at least of the following characteristics, namely, permanent elasticity, pliability and compressibility when cold, and being waterproof and quick setting, non-oxidizing, non-inflammable and heat insulating, adhesive, and capable of becoming fluid when heated; and an outer layer or layers which may conveniently be referred to as "skins" which consist either of webs of paper, cloth, or other substance waterproofed or not, as desired, and applied to and defining the outer faces of the filler layer; which alternatively may consist of integral crusts produced by a modification (by appropriate means or agents) of the physical or chemical characteristics of the outer layer of the filler composition; or which further may consist of films of other materials deposited upon the surface of the intermediate plastic filler layer.

Such sheet material, as disclosed in my aforesaid pending application constitutes a very convenient, practical, and cleanly form for handling, transporting or storing filler material of the sticky nature above referred to, and which has heretofore been found of especial utility as a bottom filler for shoes. As suggested in my aforesaid copending application, this sheet-like strip may be cut up into individual filler leaves or small pieces and in the latter form the material is inserted by hand and while cold (i. e., normal room temperature) into the shoe cavity.

Further, as suggested in the aforesaid pending application, while the sheet material may be cut up into these individual leaves or pieces by the maker, it is often more convenient and economical for the shoe manufacturer to cut up the sheets himself, since he is thus able to supply each particular size of filler leaf as needed and is not obliged to maintain large stocks of cut-out leaves on hand. However, this necessitates the shipment of the material in the form of large sheets from the maker to the shoe manufacturer which, as above pointed out, is troublesome, while furthermore, the handling of these sheets in the shoe factory often results in a large loss both from breakage and inefficient cutting methods, particularly when the filler leaves are of the curved contour disclosed in my aforesaid application.

I have now discovered a method of treating normally stiff sheet material, whatever its composition, in such a manner as temporarily to make it compact for transportation or storage without substantially impairing its utility as a sheet material, (at least for most purposes) and at the same time I reduce the sheet material to such a form as greatly to facilitate its rapid division into smaller sections with a minimum of waste.

Broadly stated I accomplish this desirable result by providing lines or regions of weakness, as by scoring or incising the sheet material along parallel lines, preferably spaced equally apart (although for special purposes it is conceivable that an unequal spacing might be desirable), the scorings or incisions being alternately upon opposite sides of the material, and after thus scoring the material I fold the sheet accordion-like as defined by the scores or incisions, thus producing a package of a width substantially equal to the distance between the adjacent score marks and of a thickness equal to the summation of the thickness of the several folds or plaits comprising it. This package is compact, intrinsically strong and stiff and can be handled in transportation or storage or during subsequent operations in the same way as any thick and solid body. Thus, if desired, it may merely be bound with tape or the like before shipment to prevent its unfolding, without necessitating the employment of further wrapping means, or it may be bundled with like packages or boxed, as desired. Such a package or folded sheet when it arrives at its ultimate destination may be treated in accordance with the character of the sheet material composing it and the purpose to which it is to be put. For shoe filler purposes, it is often preferable not to cut through the skin, but simply make the string or series of little pieces weak at the lines or regions where they must be torn apart or otherwise separated to provide the individual filler pieces, one for each shoe-bottom. Such a region of weakness is provided for example by tapering the meeting ends of two pieces to a narrow neck or line of connection, which, being narrow or less in size is weak at that point or region. The individual pieces are thus hinged or flexed together in zig-zag relation or accordion folded fashion into a large package and yet readily separated from each other at the points of easy bending made by the regions of weakness (by the incisions, narrow necks, or other equivalent means).

Assuming that the material be of heat insulating character, for example, asbestos, slag wool, cork, or other composition providing minute air spaces or other insulating properties, it may upon arrival at its destination be separated along the fold lines into individual narrow panels for use in building up insulating wall packings, coverings, etc. or it may be opened out into sheet form again and employed in the same way as an ordinary sheet in the construction of insulating sheathings or the like, or, if the desired parts are small, such parts may be cut from the package (folded sheet) by slicing or dieing through the thickness of the latter, thus producing a large number of duplicate parts at one operation.

If the sheet material be designed for use in building construction, for example, if such material comprise plaster, cement, or other ingredients of a similar nature, it may likewise be separated into narrow panels along the fold lines; it may be employed in toto and in its original folded form as a strut or brace member, or it may be opened out into sheet form and applied to the wall in the same way as ordinary wallboard, preferably being disposed in such manner as to cause the fold lines to extend transversely of the studs or other supports.

When, as herein more fully described, the sheet material is designed primarily as a basis for the production of shoe fillers, such sheet material as initially prepared, preferably (though not necessarily so far as the broader aspects of the invention are concerned) comprises an intermediate layer of permanently plastic composition of the general kind disclosed in the above-mentioned patents to Thoma or such modification thereof as circumstances or further research may indicate to be desirable and having outer layers or skins of a material or substance (for example, paper) having a dry (substantially non-adhesive) surface and of a character such as to impart a certain degree of stiffness and preferably tensile strength to the composite sheet. In scoring sheet material of this particular character I preferably cut through the outer skin on one side, extending the incision partly or wholly through the plastic filler, but leaving the skin at the opposite side intact (so far as this particular incision is concerned), it being understood that the next adjacent incision enters from the opposite side of the sheet and likewise extends through one outer layer or skin and usually to a substantial part of the way through the plastic filler material.

After folding this scored sheet I may, as described, ship it in this folded form or package to the shoe manufacturer to be cut by him into individual filler leaves or, on the other hand, the maker of the sheet material may cut it up into leaves and ship it in this form to the shoe manufacturer.

In either case I find it both convenient and economical to cut the filler leaves without unfolding the package, thus at one cutting operation producing a plurality of such leaves each of the same size. If the individual filler leaves are of such dimensions that they do not extend entirely across the width of a component fold of the package, the leaves when cut will be separate and independent, but if the width of the package be properly predetermined, so that the filler leaf extends from edge to edge (that is, from fold to fold) of the package, the leaves when cut will be joined together at their ends (or sides as the case may be) forming a continuous string of as many filler leaves as there are folds in the package.

Prior to use these leaves may readily be separated merely by tearing at the point or region of weakness, whatever it may be, as for example along the fold line where they are connected only by the outer skin or integument of the original sheet in the species herein illustrated, and such string-like package of filler leaves is very convenient from the standpoint of the operator in the shoe factory since he may throw one or more such strings over his shoulder or arm, leaving both hands free, and, standing before a rack of shoes, may tear off and apply a filler leaf or leaves or pieces to each shoe with great rapidity and without the use of special tools or apparatus and without substantially halting the flow of shoes through the factory. This mode of applying filler to shoes is obviously a great advance over any of the previous methods, and is made practicable by the employment of my novel filler piece (i. e. plastic filler compound in sheeted form having a skin or integument providing a normally non-adhesive surface) which may be handled cold and in the same way as a piece of felt, cardboard or the like but which flows when subjected to leveling pressure and fills the entire shoe cavity in the same way as the plastic filler which is ordinarily applied hot.

My new sheet-like lamellar plastic filler material renders it unnecessary to cut the filler to conform even roughly to the curved contour of the shoe cavity as has heretofore been necessary, and hence it is feasible to employ a radically different shape. Taking advantage of this fact, I am able to cut without any waste the entire large sheet and yet get individual bottom-filling pieces adapted to the present day shoe factory requirements. To this end, by giving the filler leaf a polygonal contour and by choosing the proper polygonal shape I am able to cut such filler leaves with no waste of material while at the same time, such polygonal leaves when applied to the shoe cavity and subjected to pressure fulfill the desired purpose in the same way as leaves such as previously provided having curved contours.

Thus, for example, I may make the leaves square or oblong, triangular or trapezoidal, all of such leaves having straight edges and when properly laid out using substantially all of the original material without intervening scraps or waste such as necessarily occurs when the filler leaves are cut with curved contours, the saving in material made in this way being as high in some cases as forty percent.

One shape which I find well suited for the purpose is a symmetrical trapezoid or truncated triangle. For example, a trapezoid having base angles of approximately 75° and having its wider or base end approximately twice the length of its top or narrower end is quite satisfactory since this shape approximately fills the forward part of the cavity of the average shoe, but I do not in any way intend to restrict myself to this particular base angle or relative length of base and top nor to this particular configuration since for shoes of different styles, sizes and widths as well as for use in different parts of the same shoe cavity, filler leaves of any suitable shape may be provided. Many advantages inhere in the polygonal, and preferably the double trapezoidal, shape of Figure 8, irrespective of whether the filler material is spreadable or not; for example, its economy, as more pieces of this shape can be cut from a given size of sheet than of other shapes, its adaptability to bottom cavities of all shapes and sizes, as the wide middle and tapering ends roughly approximate the contour of the usual shoe bottom cavity, and the angular shape adjusts itself readily and has less tendency to move in a shoe bottom than if not angular, by reason of its frictional contact or interlocking engagement with the indented or irregular lapped edges of the inturned upper around the bottom cavity. Moreover it is easier to apply as the opposite angles find the widest part of the bottom readily. A smaller number of sizes of such polygonal pieces is practicable for a given range of shoe sizes than other shapes, so that the shoe manufacturer need not carry in stock so many sizes as heretofore. And this shape gives the broader support at the point where most needed for the ball of the foot.

Figures 1, 2, 3, 4, 5, 6, 7, 8, 9, 23:
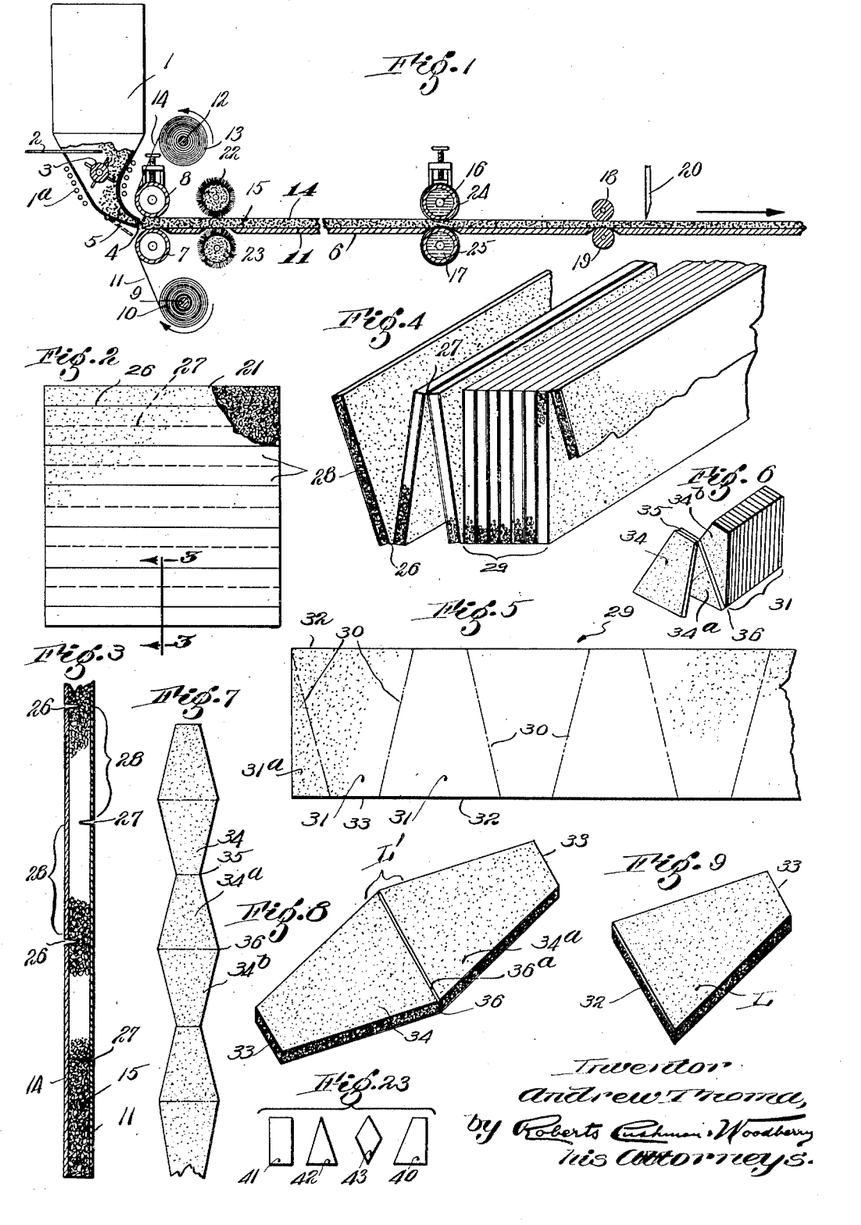
Fig. 1 is a diagrammatic view illustrating one form of apparatus useful for example in preparing sheeted material of the general type more fully disclosed in my copending application No. 183,302 filed April 13, 1927 such apparatus being provided with means for scoring the material in accordance with the present invention.
Fig. 2 is a plan view, partly broken away, showing a section of sheet material scored in accordance with the present invention.
Fig. 3 is a fragmentary transverse section to large scale on line 3—3 of Fig. 2 through a piece of sheeted material such as hereinabove described as suitable for shoe filler, illustrating the arrangement of the incisions formed therein.
Fig. 4 is a perspective view illustrating the method of folding incised sheet material to form a compact package.
Fig. 5 is a plan view of such a package or folded sheet showing one desirable arrangement of incisions for dividing such package into blocks to form strings of shoe filler leaves.
Fig. 6 is a perspective view of one of such blocks (partly unfolded) of shoe filler leaves as cut from the package or folded sheet.
Fig. 7 is a plan view showing a string of shoe fillers of one desirable shape ready for use.
Fig. 8 is a perspective view showing a pair of such shoe filler leaves united to each other but detached from the string to constitute a single filler piece.
Fig. 9 is a perspective view illustrating a single filler leaf.
Fig. 23 is a diagram illustrating shoe filler pieces of various shapes.

Moreover, in the form of filler piece shown in Fig. 8 the incision in the outer skin, formed by the cut (26 or 27) affords a slit or outlet through which the sticky, plastic filler material of the inner layer may exude into adhesive contact with the adjacent surface of the shoe bottom when the filler piece is applied under the usual leveling pressure.

Whatever the shape I prefer to cut the filler leaves in strings as suggested, and if trapezoidal leaves be used the string will consist of two leaves united by their wide bases followed by two leaves united at their narrow ends, etc. From the strip or string individual leaves may be torn, but usually I prefer to remove as a unit a pair of leaves united by their broader ends since such a pair of leaves united by their broader ends forms a filler piece which closely approximates the entire forepart cavity, including the narrow toe and the forward part of the shank.

The individual filler leaf or pair of leaves, or the string-like package thereof may be cut in various ways, for example, by single successive cuts or incisions or by a plurality of simultaneous cuts or I may cut such string-like packages of united leaves from a single sheet of the composite material.

In the accompanying drawings

Fig. 1ᵃ is a vertical section to large scale on line 1ᵃ—1ᵃ of Fig. 1ᵇ illustrating one desirable arrangement of scoring cutters;

Fig. 1ᵇ is a front elevation of the cutting devices shown in Fig. 1ᵃ;

Referring to Fig. 1 I disclose an apparatus well adapted for making one desirable form of sheeted material, such material and apparatus being illustrated and described herein merely by way of example but without in any way intending to restrict the present invention to sheeted material initially produced by such specific means or method.

In Fig. 1, the numeral 1 designates a supply reservoir or receptacle adapted to contain any plastic material which may for example be of the general character of the shoe-filler material disclosed in the patent to Thoma No. 832,002, September 25, 1906; said reservoir being herein shown as provided with a sliding damper or baffle plate 2, with a stirrer 3, and with a delivery nozzle 4, the latter having, if desired, a regulating damper 5 for varying the rate of delivery. To facilitate downward flow of the material, I may if desired provide the lower part of the receptacle with an external heating coil 1ᵃ for keeping the outer surface of the nozzle end of the receptacle warm.

The apparatus comprises a substantially horizontal table 6 terminating at a point adjacent to the end of the delivery nozzle 4 and provided at this end with a pair of heated compression rollers 7 and 8 suitably supported and preferably adjustable relatively to one another.

A spindle 9, suitably supported, carries a roll 10 of paper or other web-like material 11 which passes over the roller 7 and thence along the top of the table 6. A second spindle 12 supports a roll 13 of web-like material 14 which passes beneath the roller 8 and is also drawn forwardly over the table 6. As disclosed more fully in my copending application Serial No. 133,506, filed September 3, 1926, and Serial No. 183,302, filed April 13, 1927, one or both of the webs 11 and 14 may be of waterproof character, or may pass through a waterproofing bath on their way to the rolls 7 and 8.

The nozzle 4 delivers the plastic filler material from the receptacle 1 into the space between the webs 11 and 14, as defined by the rollers 7 and 8, and as the webs 11 and 14 are moved along over the surface of the table, the plastic material is drawn between them and is spread by the hot rollers 7 and 8 to form a composite sheet having the webs 11 and 14 engaging the opposite surfaces of the plastic material 15, and after the composite sheet material thus formed has had a chance to cool or partially set, I pass it between a second set of compression rolls 16 and 17 in which it is reduced to its final thickness. The sheet now moves along the upper surface of the table 6, preferably assisted by a pair of feed rollers 18 and 19, until it passes the plane of movement of a vertically moving knife 20 which is adapted to sever the sheet to provide suitable lengths 21 for folding or forming into "packages" or "sheet-like packages" 29.

If desired the surfaces of the sheet-like material may be dusted or coated with some anti-friction substance, such as talc or mica dust, by means of hollow distributing cylinders or rollers 22 and 23, such rollers being perforated and preferably provided with brush bristles for distributing the powder as it is discharged through the perforations. During its passage between the hot rollers 7 and 8 the more fluid elements of the binder tend to penetrate and saturate the paper webs and if these webs are of thin or pervious material sufficient of the binder may pass through the web to render the outer surface slightly adhesive. The slightly adhesive outer surface of the web causes the talc or other slippery powder to adhere firmly, while at the same time the penetration of the web by the binder makes the web water-repellant.

While I have thus shown a convenient and desirable apparatus for producing sheet material in pieces or packages of definite size, my invention is not restricted in any way to this mode of producing such sheet-like material although I find it convenient to perform the first step of my present process concomitantly with the final compression of the sheet material by the rollers 16 and 17 and before the sheeted material has been cut into definite lengths. However, this first step of my present process, as now to be described, may be performed after the material has been cut up into lengths and after it has received its final compression or other operation for reducing it to a uniform thickness.

This first step in my present process consists in scoring or incising the sheet material along parallel lines, preferably spaced equally apart, alternate scores or incisions being in opposite faces of the material. For producing this result I prefer to provide each of the rollers 16 and 17 with a series of radial disk-like knives 24 and 25 (Figs. 1ª and 1ᵇ) respectively, each knife of one roller preferably being disposed opposite to a circumferential groove or depression in the opposite roller.

When the rollers 16 and 17 are provided with knives, as just suggested, the appearance of the sheeted material after leaving the rollers is substantially as indicated in Figs. 2 and 3. In Fig. 2 the upper surface of the material is shown as having the parallel longitudinal slits or incisions 26, while the lower surface has the parallel slits 27, the latter slits being substantially midway between the slits 26 in the upper surface.

If the sheet material be of laminated form such as produced by the apparatus of Fig. 1 (comprising a central filler body 15 and outer skins 11 and 14 respectively) I prefer to make the cuts or incisions of such depth that they extend through one of the outer skins or webs and partially through the filler body but leaving the opposite web intact. This arrangement of the cuts or incisions is indicated to large scale in Fig. 3. Adjacent cuts or incisions, that is to say a cut 26 in the upper surface and a cut or incision 27 in the lower surface define between them a narrow panel or strip 28 of the sheeted material and after a length of the material has been provided with such cuts or incisions it may easily be folded transversely in the manner indicated in Fig. 4; that is to say, it may be collapsed in the manner of an accordian, forming a compact bundle 29 consisting of superposed and closely contacting panels 28. Such a bundle occupies but little space laterally as compared with the original flat length of sheet 21. It is quite rigid and inflexible so that it needs but little support or protection during handling or transportation and is much more convenient for handling than the wide, relatively thin sheet-like package 21. Such a folded sheet or collapsed package 29 may be handled in substantially the same way as any solid bulky material and may be shipped without substantial protection except for such binding as may be necessary to keep it in collapsed form. It may be bundled with other similar packages or packed in boxes of convenient form and size and may thus be shipped from the maker to the user and kept in storage without any unusual precautions either in handling or in storage.

This feature is of particular importance when the sheeted material is of a character suitable for use as a shoe filler. For example as shown in Fig. 5, which represents a plan view of one of the packages 29, I may, by means of cuts or incisions along lines such as indicated at 30, divide the package 29 into blocks 31 of trapezoidal shape and consisting of a series of leaf-like sections 34 each of trapezoidal shape having a wide base 32 and a relatively narrow end or top 33. It may be noted that in forming the cuts 30 through the package 29 as indicated in Fig. 5 I produce blocks 31 whose wide and narrow ends alternate with each other, the series of blocks 31 thus collectively making up substantially the entire package 29 except for a small triangular portion 31$^a$ of waste material at each end of the package. As indicated in Fig. 6 the leaf-like filler members 34, 34$^a$, 34$^b$, etc. making up the block 31 are united alternately at their small ends as indicated at 35 and their large ends as indicated at 36 so that such a block 31 may be spread out to form a string as indicated in Fig. 7 and such a string of filler leaves 34, 34$^a$, etc. forms a very convenient package for use by the operator in applying the filler leaves to the shoe.

For example, if a single filler leaf, that is to say one of the trapezoidal sections 34, is to be applied to the toe or heel portion of the shoe cavity, the operator merely tears the endmost section from the string at its region of weakness 35 and places this filler leaf L (Fig. 9) in the toe or heel portion of the shoe cavity. If necessary, adhesive may be applied to the surface of the inner sole or to the filler leaf or both prior to application of the filler leaf; the leaf may be attached by means of a tack (although objectionable), preferably the same tack which holds the shank piece in place; a small section of the outer skin or web may be torn off to expose the sticky filler; or if the filler leaf be of a material having a strip-off web adapted to leave an exposed adhesive surface, as described in my copending application Serial No. 183,302, filed April 13, 1927, such strip-off piece may be pulled off by the operator and the exposed adhesive surface of the leaf directly applied to the shoe bottom.

Whatever mode of attachment be employed it is obvious that the strip of filler leaves or individual pieces constituting the string-like package shown in Fig. 7 may conveniently be thrown over the operator's shoulder or over his arm, leaving both hands free for applying adhesive, inserting a tack, or otherwise preparing and securing the filler, and the operator may readily perform the filling operation by standing before a rack of shoes, removing the shoes one by one from the rack and applying the filler without necessitating the movement of the shoe rack to the neighborhood of any particular machine or apparatus as is necessary with all other modes of applying filler known to me, and thus it is not necessary to stop the flow of shoes through the factory to permit the filling operation to be carried out.

Figures 10, 11, 16:
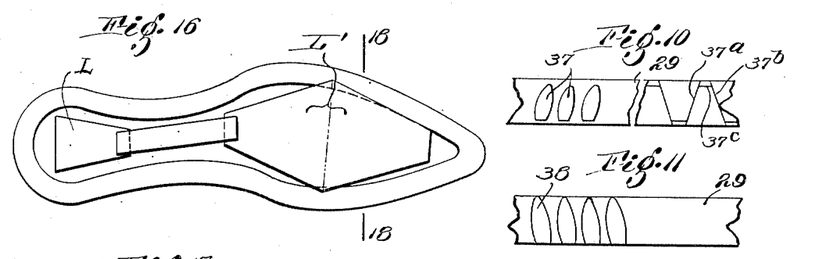
Fig. 10 is a plan view similar to Fig. 5 but illustrating other methods of laying out the work for cutting.
Figs. 11 and 12 are similar views illustrating modified ways of cutting out the material.
Fig. 16 is a plan view illustrating a McKay shoe prior to the application of the outer sole and showing a double filler leaf (such as indicated in Fig. 8) applied to the forepart cavity in the shoe bottom.

Preferably in order to fill the forward part of the shank of the shoe as well as the forepart, a pair of united adjacent filler leaves constituting a double trapezoidal filler package L' (Fig. 8) may be removed as a unit from the string and applied as indicated in Fig. 16.

In cutting up the package 29 to form the blocks 31, I may obviously make the successive incisions or cuts 30 by means of a single knife to which the package 29 may be presented in proper position for successive cuts, or I may form two or more cuts simultaneously by means of a suitable form of duplex or multiple knife or other cutting instrumentality.

While the string-like package above referred to has certain very obvious advantages some of which have been pointed out, the folded sheet or package 29 may also conveniently and effectively be employed in producing fillers which are not united in string form. Thus as indicated for example at the left side of Fig. 10, I may cut from the package 29, filler leaves of the shape indicated at 37, such fillers being cut by a suitable die and being of a curved contour more or less conforming to the shape of the shoe cavity. As shown in this figure these fillers leaves 37 do not extend across the entire width of the package 29 so that when cut they are separate and independent, so that, as indicated in Fig. 13, the filler leaves 37 and 37$^a$ cut from adjacent panels 28 of the package 29 may constitute right and left fillers, even if the opposite surfaces of the original sheeted material (from which the package 29 was made) are of unlike character.

At the right hand side of Fig. 10, I have indicated a method of producing separate double trapezoidal pieces such as L', which consists in making straight diagonal incisions 37$^a$ and 37$^b$ extending across the entire width of the package, and longitudinal incisions 37$^c$ which separate the trapezoidal leaves at their smaller ends, although they are still united at their larger ends, thus forming a pile of double trapezoidal pieces L', such separate pieces being preferable, under some circumstances, to the string packages.

In Fig. 11 I have indicated the production of fillers 38 having curved contours but which extend from one edge to the other of package 29. When fillers are cut in this manner from the package there results a string (as shown in Fig. 14) of filler leaves 38, 38$^a$ etc., right and left leaves being united in alternating succession.

Figures 1A, 13, 14, 15, 20:
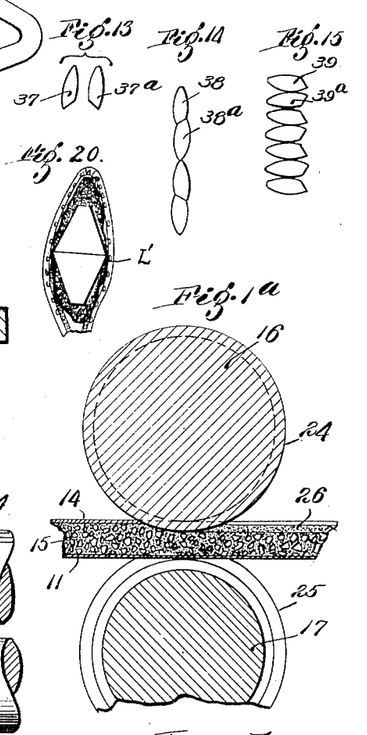
Fig. 13 is a plan view showing a pair of filler leaves resulting from laying out the work as shown at the left of Fig. 10.
Fig. 14 is a plan view illustrating a string of filler leaves such as produced by laying out the work as shown in Fig. 11.
Fig. 15 is a similar view showing a string of filler leaves as produced by laying out the work as shown in Fig. 12.
Fig. 20 is a plan view illustrating the appearance of a shoe after leveling, the outer sole being removed.
Figure 12:
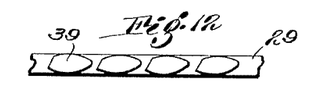
Figures 17, 18:
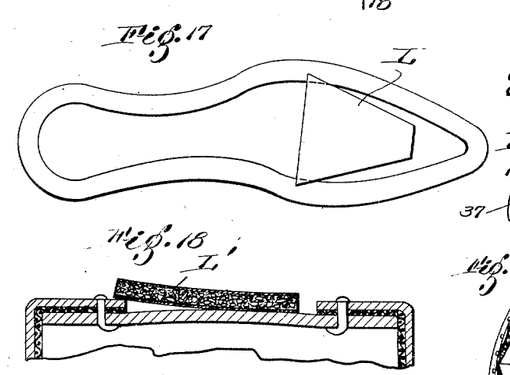
Fig. 17 is a similar view showing a single filler leaf such as indicated in Fig. 9 applied to the toe portion of the cavity.
Fig. 18 is a transverse section substantially on the line 18—18 of Fig. 16 but to larger scale.
Figure 19:
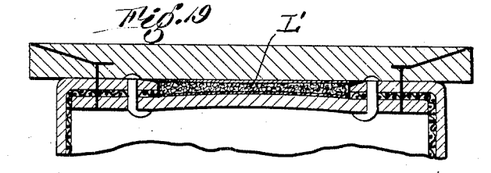
Fig. 19 is a similar section but showing the outer sole of the shoe in position and indicating the appearance of the filler after the leveling operation.

Likewise in Fig. 12 I have shown similar filler leaves 39 so cut from the package 29 as to cause them to join at their edges to form a string as shown in Fig. 15 wherein the leaves 39 and 39$^a$ are also united in alternating succession, a right leaf succeeding a left leaf, but united at their lateral edges. Such strings of filler leaves may be used in the same way as those shown in Figs. 5 to 9 inclusive although the latter form is the preferred form since it eliminates waste of the material amounting in some cases to as much as 40 per cent, as compared with leaves of curved contour.

While in Figs. 5 and 9 I have shown the trapezoidal leaves as of symmetrical form, I wish it to be understood that I am not limited to this exact form as it may be desired to make the leaves unsymmetrical as shown at 40 (Fig. 23) so that they may conform more closely to the shape of the shoe cavity, in this way also producing rights and lefts. I may on the other hand form these polygonal leaves (as indicated for example in Fig. 23) as triangles 42; as rectangles 41; or as diamonds 43, or other suitable shape, any of such polygonal forms being economical since they can be so cut as to avoid substantially all waste of the material.

The above described method of dividing the sheet material into sections by straight cuts as illustrated, for example, in Figs. 5 and 23, and at the right side of Fig. 10, is advantageous not only from the standpoint of economy in material, since it avoids almost all waste, but further from the fact that it may be done by the use of straight knives. Whereas it is almost impossible to cut the sticky plastic shoe bottom filler by means of hollow dies from which the died out pieces can be removed only with great difficulty, the material is readily divided by the use of a straight knife, preferably heated, by means of which it is possible to cut through a great number of layers of the material in a single cutting operation.

While the above described method of cutting and handling the material is convenient, it should be noted that the transverse incision thus produced at the line 36$^a$ in the piece L' of Fig. 8 is not necessary when this package is used as shown in Figs. 16 and 20, and I contemplate that such double trapezoidal piece L' may be made by other methods which will not produce the transverse incisions 36$^a$, thus leaving both surfaces of such piece intact.

As pointed out in my copending application Serial No.183,302, the use of these dry and non-adhesive filler leaves provides many and great advantages over usual modes of filling shoe bottoms since these leaves may be handled without heat and without necessitating the employment of special apparatus or tools, without devoting any special part or area of the floor space of the factory to the filling operation, and without necessitating any particular care or skill upon the part of the operator. These leaves are not in any way to be compared to sheet fillers which have previously been employed (consisting of felt, tar paper, roofing paper, sheet cork, or other such substances cut substantially to shape and secured in the shoe cavity), since all of such previous forms of sheet filler material have had the great disadvantage that they must for ideal results be laboriously cut and trimmed or carefully pre-formed to conform exactly to the shape of each shoe cavity (this being a substantially impossible limitation from the practical standpoint due to the irregularity in the shape of the cavity) no two being the same, as otherwise the filler does not perform its intended function, or results in the production of humps or ridges in the outer sole. On the other hand, the filler leaves produced as herein described are of a plastic nature, capable under the pressure of the leveling process of spreading freely and thus automatically conforming accurately to the cavity of the shoe.

Figures 1B, 21, 22:
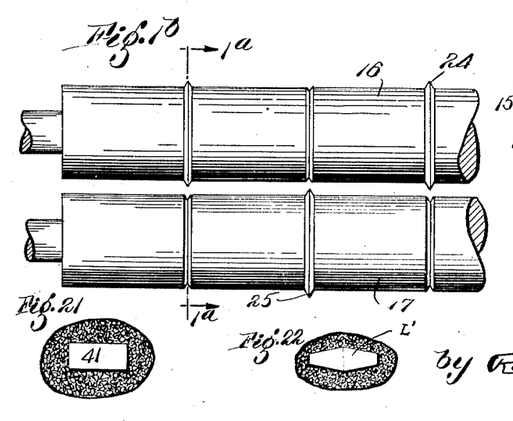
Figs. 21 and 22 are diagrams illustrating the shape of the mass of material resulting from compression of packages originally of oblong rectangular, and double trapezoidal shape, respectively.

In Figs. 21 and 22 I have shown the results of compressing between flat surfaces filler pieces 41 and L' of rectangular and double trapezoidal form, respectively, and the shape of the exuded mass of filler material, and in Fig. 20 I have shown how the plastic filler piece L' spreads when the shoe is leveled and fills all the recesses of the cavity. No particular care is necessary in applying such filler leaves since even though portions of the filler leaf may extend over the edges of the cavity and lie upon the gathered in edge of the upper, the overlying portion of the leaf squeezes back into the cavity or into the spaces between the folds of the upper material so that it does not add materially to the thickness of the edge of the upper material, although it may and usually does fill the spaces between the folds or gathers of such material, (as shown in Fig. 20) thus producing a much more even surface for engagement with the outer sole than has ever heretofore been produced by the use of a sheet filler. Furthermore, when the filler package is employed in a McKay shoe cavity, the thin sticky mass of filler material adheres firmly both to the inner sole and outer sole, (the outer web of the package often bursting under leveling pressure), and while the remnants of the web remain and stiffen the mass and obstruct its flow, the binding action of the filler is so great that it is possible in many cases to use a thinner insole than usual, thus effecting a further saving in shoe production.

While I have herein described certain desirable uses for the package 29 as shown in Fig. 4 and have suggested certain ingredients of which the sheet material may be composed, I do not wish to be limited to such use or materials but wish it to be understood that the invention is of broad scope and while suitable for the purposes mentioned and particularly to use in the shoe industry, it may be found applicable for other purposes and in other environments.

I claim:

1. A package of shoe filler material, in the form of a string of individual lamellar filler pieces, joined by easy-bending regions of weakness permitting them to be bent on each other in accordion folded fashion or zig-zag relation and to be readily separated, each piece having a spreadable interlayer and shape-maintaining supporting and protecting cover skin.

2. The herein described shoe filler piece, consisting of a sheet-like piece of shoe filler material adapted for the filling of a single shoe-bottom cavity and having a polygonal contour for facilitating cutting, packaging and use in filling shoe-bottoms.

3. The herein described shoe filler piece, consisting of a sheet-like piece of spreadable shoe filler material adapted for the filling of a single shoe-bottom cavity and having a polygonal contour as an article of manufacture, but self-shaping under pressure to fit varying sizes and shapes of shoe-bottom cavities.

4. A polygonal package of sheet material having an inner layer of plastic material interposed between outer skins, said package comprising a series of superposed leaves of polygonal contour, each leaf being united to the adjacent leaf at one side by means of one of the outer skins and being united to the adjacent leaf at the other side by means of the other outer skin.

5. A shoe filler piece, having the contour of a pair of trapezoids united at their wide ends, said piece comprising a layer of normally plastic shoe filler interposed between outer skins.

6. A sheet-like shoe filler piece, of trapezoidal contour having normally non-adhesive and slippery outer surfaces and comprising shoe filler material which is normally sticky and which flows at normal temperatures when subjected to shoe-levelling pressure thereby conforming itself to the shape of adjacent parts of the shoe.

7. A sheet-like shoe filler piece having a self-sustaining, sheet-like form capable of occupying the cavity between the outer sole and inner sole of the shoe-bottom and having a coherency characteristic, and comprising a body layer whose edges have points of contact to provide limited, point-like engagement with the outer edges of the shoe cavity and to facilitate the frictional edge engagement and interlocking of the filler piece with the rough or uneven inturned edges of the upper.

8. A sheet-like shoe filler piece having a self-sustaining, sheet-like form capable of occupying the cavity between the outer sole and innersole of the shoe-bottom, and having a coherency characteristic, and having a shape distinct from that of a shoe-bottom cavity which it is to occupy and having limited edge projections for correspondingly restricting to said projections the engagement of the piece with the edges of the shoe cavity.

9. A sheet-like shoe filler piece having a self-sustaining, sheet-like form capable of occupying the cavity between the outer sole and innersole of the shoe-bottom, and having a coherency characteristic, with angular edges facilitating the frictional edge engagement and interlocking of the filler piece with the rough uneven inturned edges of the upper.

10. A sheet-like shoe filler piece having a self-sustaining, sheet-like form capable of occupying the cavity between the outer sole and innersole of the shoe-bottom, and having a coherency characteristic, said piece being polygonal in outline and having a plurality of peripheral angles constituting points of contact with the inturned edges of the upper when placed in filling position in the shoe-bottom cavity.

11. As a new article of manufacture, a shoe filler piece comprising a sheet-like piece of shoe filler material having a polygonal contour widest at the middle and tapering to a relatively narrower width at each end, for approximating the contour of the usual shoe bottom cavity and at the same time facilitating cutting and packaging the filler piece.

12. As a new article of manufacture, a sheet-like shoe filler piece comprising a layer of shoe filler material which is sticky, adherent to leather and normally plastic, and a supporting and protecting skin or integument on said layer having an incision therein through which said sticky filler material may exude into contact with the adjacent part of a shoe in the application of the piece to the shoe.

13. A package of shoe filler material in the form of a string of individual lamellar, sheet-like filler pieces, each piece having a polygonal contour widest at the middle and tapering to a relatively narrower width at each end, and each piece comprising a spreadable layer and a supporting skin, said pieces being connected one to another at their narrower ends by said supporting skin which extends continuously from one piece to the next, said connected narrow ends constituting easy bending regions of weakness adapted to permit the pieces to be folded one on another and to be readily separated.

14. A shoe filler piece comprising a sheet-like piece of shoe-filler material adapted for filling a single shoe-bottom cavity, said sheet-like piece being of relatively great thinness as compared with its area and being adapted when subjected to pressure to spread in the plane of the sheet to a roughly oval shape conforming generally to the shape of the shoe-bottom cavity.

15. A shoe filler piece comprising a sheet-like piece of shoe-filler material adapted for filling a single shoe-bottom cavity, said sheet-like piece being of relatively great thinness as compared with its area and having a polygonal contour of relatively greater length than width and being adapted when subjected to pressure to spread in the plane of the sheet to a roughly oval shape conforming generally to the shape of the shoe-bottom cavity.

Signed by me at Boston, Massachusetts, this 28th day of April, 1927.

ANDREW THOMA.